United States Patent [19]

Phillips et al.

[11] Patent Number: 5,570,847
[45] Date of Patent: Nov. 5, 1996

[54] METHODS OF HEAT-TREATING MILTILAYER INTEFERENCE PLATELETS

[75] Inventors: Roger W. Phillips; Shari P. Fisher; Paul G. Coombs, all of Santa Rosa, Calif.

[73] Assignee: Flex Products, Inc., Santa Rosa, Calif.

[21] Appl. No.: 356,848

[22] Filed: Dec. 15, 1994

Related U.S. Application Data

[60] Division of Ser. No. 231,396, Apr. 22, 1994, which is a continuation-in-part of Ser. No. 171,654, Dec. 22, 1993, which is a division of Ser. No. 902,693, Jun. 23, 1992, Pat. No. 5,279,657, which is a continuation of Ser. No. 719,166, Jun. 21, 1991, Pat. No. 5,171,363, which is a continuation of Ser. No. 251,034, Sep. 26, 1988, Pat. No. 5,059,245, which is a continuation of Ser. No. 812,814, Dec. 23, 1985, abandoned, which is a continuation-in-part of Ser. No. 567,638, Jan. 3, 1984, abandoned, which is a continuation of Ser. No. 314,695, Oct. 26, 1981, Pat. No. 4,434,010, which is a division of Ser. No. 108,004, Dec. 28, 1979, abandoned.

[51] Int. Cl.$^6$ ..................................................... C09C 1/62
[52] U.S. Cl. ................. 241/23; 106/400; 106/403; 106/415; 359/580; 359/585; 427/372.2; 427/383.5; 427/383.7; 428/403; 428/404; 428/457; 428/469
[58] Field of Search ............................ 428/363, 403, 428/404, 457, 469; 106/400, 403, 404, 415, 436, 312; 359/580, 582, 585, 586, 588, 589; 264/140, 144, 162; 427/214, 215, 216, 217, 419.1, 419.3, 383.3, 383.7, 383.5

[56] References Cited

U.S. PATENT DOCUMENTS

| | | | |
|---|---|---|---|
| 3,087,838 | 4/1963 | Linton | 106/291 |
| 3,123,489 | 3/1964 | Bolomey et al. | 106/291 |
| 3,123,490 | 3/1964 | Bolomey et al. | 106/291 |
| 3,374,105 | 3/1968 | Bolomey | 106/291 |
| 3,410,626 | 11/1968 | Magrath | 350/166 |
| 3,858,977 | 1/1975 | Baird et al. | 356/71 |
| 4,168,986 | 9/1979 | Venis, Jr. | 106/291 |
| 4,216,018 | 8/1980 | Bilofsky et al. | 430/207 |
| 4,434,010 | 2/1984 | Ash | 106/291 |
| 4,705,356 | 11/1987 | Berning et al. | 350/166 |
| 5,059,246 | 10/1991 | Phillips et al. | 106/22 |
| 5,171,363 | 12/1992 | Phillips et al. | 106/22 R |
| 5,279,657 | 1/1994 | Phillips et al. | 106/22 R |

Primary Examiner—D. S. Nakarani
Assistant Examiner—Vivian Chen
Attorney, Agent, or Firm—Flehr, Hohbach, Test, Albritton & Herbert

[57] ABSTRACT

A method of heat-treating multilayer interference platelets to improve the durability of the platelets comprising subjecting the platelets at a temperature of 200°–300° C. for 10 minutes to 24 hours. The platelets are formed from a multilayer interference thin film construction comprising a metal reflecting layer having a multilayer interference thin film structure on both sides of the metal reflecting layer wherein the multilayer interference thin film structure comprises a pair of layers consisting of a dielectric layer and a semi-opaque metal layer with the dielectric layer of the pair being directly adjacent to the metal reflecting layer.

2 Claims, 2 Drawing Sheets

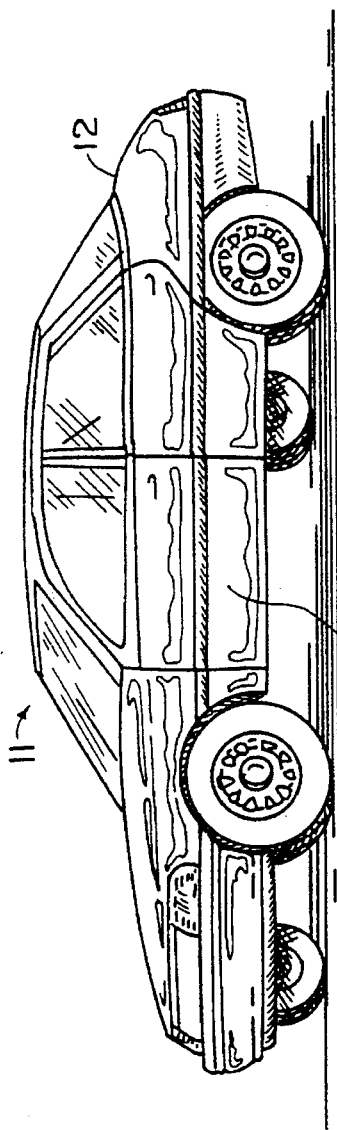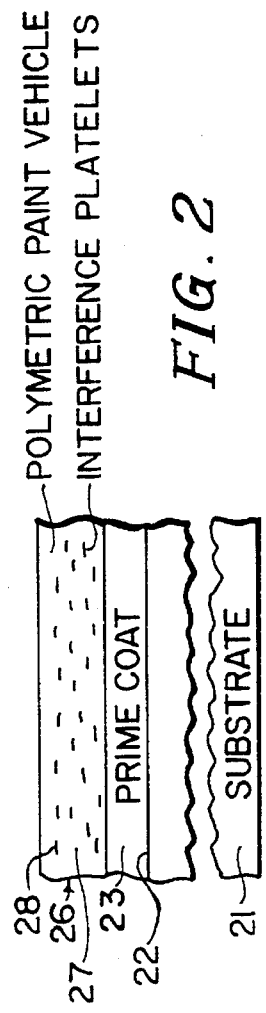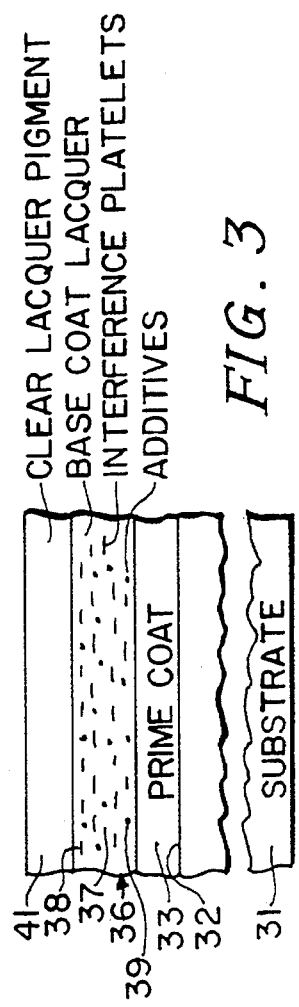

METHODS OF HEAT-TREATING MILTILAYER INTEFERENCE PLATELETS

This is a continuation of application Ser. No. 08/231,396 filed Apr. 22, 1994, now pending which is a continuation-in-part of application Ser. No. 08/171,654 filed on Dec. 22, 1993, now pending which is a division of application Ser. No. 07/902,693 filed Jun. 23, 1992, now U.S. Pat. No. 5,279,657 which is a continuation of application Ser. No. 07/719,166 filed on Jun. 21, 1991, now U.S. Pat. No. 5,171,363 which is a continuation of application Ser. No. 07/251,034 filed Sep. 26, 1988, now U.S. Pat. No. 5,059,245 which is a continuation of application Ser. No. 06/812,814 filed on Dec. 23, 1985, now abandoned, which is a continuation-in-part of application Ser. No. 06/567,638 filed Jan. 3, 1984, now abandoned which is a continuation of application Ser. No. 06/314,695 filed Oct. 26, 1981, now U.S. Pat. No. 4,434,010 which is a division of application Ser. No. 06/108,004 filed Dec. 28, 1979, now abandoned.

SUMMARY OF THE INVENTION

This invention relates to a high chroma durable paint and multilayer interference platelets for use therein.

Paints are used extensively in many different applications for different purposes. Paints are often used to provide protection to the surfaces painted. In addition, they are utilized to provide color or other appearance enhancing features to structures, articles, vehicles and many other items which are in use at the present time. There is a continuing long-felt need for paints which are durable and which have other distinguishing desirable characteristics, as for example high chroma.

In general, it is an object of the present invention to provide a high chroma durable paint and multilayer interference platelets having high chroma for use therein.

Another object of the invention is to provide platelets of the above character which are optically variable.

Another object of the invention is to provide platelets of the above character which are of a single color.

Another object of the invention is to provide platelets of the above character which are opaque.

Another object of the invention is to provide platelets of the above character which are symmetrical.

Another object of the invention is to provide platelets of the above character which are very durable.

Another object of the invention is to provide platelets of the above character which can be readily incorporated into a liquid vehicle to provide a paint in which the vehicle will solidify to provide a solidified paint.

Another object of the invention is to provide a paint of the above character which can be readily applied.

Additional objects and features of the invention will appear from the following description in which the preferred embodiments are set forth in detail.

BRIEF DESCRIPTION OF DRAWINGS

FIG. 1 is a perspective view, an automobile with a high chroma durable paint incorporating the present invention on the outer surfaces thereof.

FIG. 2 is a cross-sectional view of a paint incorporating the present invention.

FIG. 3 is a cross-sectional view of another embodiment of a paint incorporating the present invention.

DESCRIPTION OF THE PREFERRED EMBODIMENTS

Figure 5:
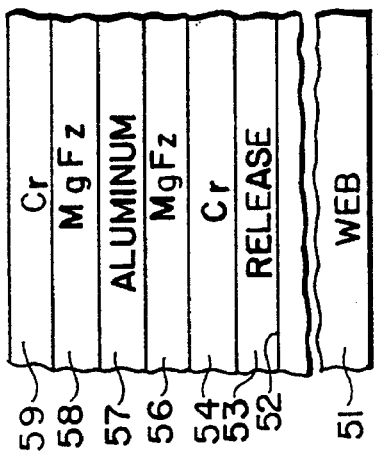
FIG. 5 is a cross-sectional view of a platelet for use in a paint incorporating the present invention utilizing a metal-dielectric multilayer thin film interference stack providing optically variable characteristics.

In general, the collection of thin film plates of the present invention which are adapted to be added to a liquid medium for producing a predetermined optical response through radiation incident on a surface of a solidified version of the medium. The collection of flakes is produced by forming a symmetrical multilayer thin film structure on a flexible web of material and separating the thin film structure from the web to provide a collection of platelets. The platelets are characterized by being comprised of a symmetrical multilayer thin film interference structure in which the layers lie in parallel planes and in that they have an aspect ratio of at least 2:1, preferably 5:1, respectively, for the longest planar dimension of the surfaces parallel to the planes of the layers and surfaces perpendicular to the planes of the layers or in other words, the thickness of the platelet. The flakes also have a maximum dimension on any surface ranging from approximately 2 to 200 microns.

More in particular, in FIG. 1, there is shown a motorized vehicle 11 of a convention type which is provided with a high chroma durable paint 12 incorporating the present invention which is provided on the exterior surface of the car body 13 which can be formed of a suitable conventional material such as steel or fiberglass. Although the high chroma durable paint 12 of the present invention has been shown being provided on the paint for the entire body of the vehicle 11, it should be appreciated that if desired, the paint 12 of the present invention can also be provided on interior and exterior molding provided on the vehicle. Also alternatively it can be utilized to provide a pin stripe on the exterior of the vehicle.

A cross-sectional view of an optically variable paint incorporating the present invention is shown in FIG. 2. The substrate 21 can be formed of a suitable metal such as steel, plastic, fiberglass, wood or any other material which is to be painted. The substrate is provided with a surface 22 to which is to be applied a high chroma durable paint of the present invention. Thus, by way of example, a primer or prime coat 23 of a suitable type can be applied to the surface 22 to ensure that the high chroma paint layer 26 will adhere to the substrate 21. The high chroma durable paint 26 of the present invention is comprised of a polymeric paint vehicle 27 which consists typically of polyesters, acrylics, epoxies, alkyds, polyurethane or latex-type formulations. Interference platelets 28 of the type hereinafter described are disposed in the polymeric paint vehicle 27. The prime coat 23 and the paint vehicle 27 with the interference platelets 28 therein can be applied to a substrate in various manners, such as brushing, spraying, flow coating, rolling or dipping.

The paint can then be dried by allowing the liquid medium to evaporate, either at ambient temperature or by force drying by infrared heating.

Another embodiment of a painted substrate painted with high chroma durable paint is shown in FIG. 3. The substrate 31 can be of the same type of substrate as the substrate 21 having a surface 32 to be painted. As shown in FIG. 3, this paint structure on the surface also consists of a prime coat 33 followed by a base coat 36 which contains a liquid vehicle 37 in the form of a lacquer with not only interference platelets 38, but additional non-interference pigments 37 that can be used to modify the color or control the brightness. Such non-interference materials can include aluminum flake, carbon black, titanium dioxide, transparent and non-transparent dyes, transparent pigments, including iron oxides and phthalocyanines. Also, interference based mica pigments can be used. Additional additives can also be included, such as viscosity controllers, antioxidant leveling agents and the like. In order to impart an additional durability to the paint being applied, an additional clear lacquer pigment 40 can be provided on the surface of the base coat 36. In the clear lacquer top coat 41, additional subtractive colorants may be added to achieve still different colors.

Figure 4:
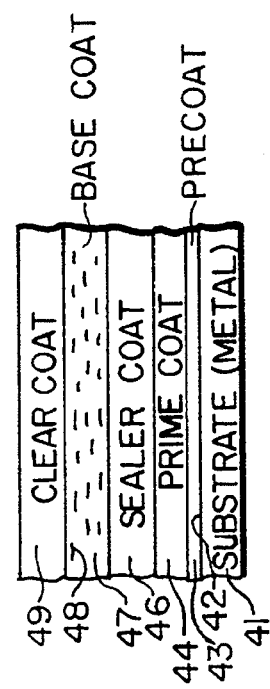
FIG. 4 is a cross-sectional view of an automobile paint incorporating the present invention.

A cross-sectional view of a portion of the body 13 of the vehicle is shown in FIG. 4 in which the body 13 is represented as a substrate 41 which can be formed of a suitable material such as steel, plastic or fiberglass. The substrate is provided with a surface 42 to which is to be applied a high chroma durable paint of the present invention. Thus, by way of example, a pre-coat 43 is first applied to the substrate 41. This pre-coat 43 is deposited using a cathodic electro-painted process using zinc phosphate coatings well known to those skilled in the art. On top of the zinc phosphate coating 43, a prime coat 44 is deposited based on epoxy/amine resins carried out by cathodic electro-coating. This resin may also contain carbon black, $TiO_2$ and other extender type pigments. These two layers 43 and 44 are deposited on to the substrate 41 for corrosion protection of the metal base substrate. A sealer coat 46 is then applied to the prime coat 44. This sealer may contain pigments, including prime pigments such as $TiO_2$ and carbon, plus extender pigments such as barium sulphate, china clay, Winnofil or talc. This sealer layer provides key properties such as mechanical resistance, i.e., stone chip resistance, flexibility, resistance to moisture and a good even surface to maximize a smooth surface to the following coats. This sealer layer or coat 46 also removes the imperfections of the metal layer.

The next layer 47 which is the base coat layer generally consists of polyester resins in which has been added optically variable pigment platelets 48 plus other color control pigments, such as $TiO_2$, carbon black, mica, aluminum flake, etc. The base coat layer 47 is followed by a clear coat layer 49 which can be a clear coat acrylic with UV blocking and light stabilizers. It functions as a scratch resistant coating and protects the underlying layers of pigment containing polymers. Alternatively, a thermosetting or a thermoplastic acrylic can be substituted for the top two layers 48 and 49. Pigments in the surface sealer coat 46 may or may not be present depending on the concentration of the optically variable pigment platelets present in the base coat 47. Generally, the base coat 47 and clear coat 49 in the form of therma setting, thermoplastic acrylics are spray coated on to the sealer coat 46. Each layer may be cured before the following layer is added by subjecting the paint structure to elevated temperatures for a period of time, i.e., the layers may be applied in the spray booth and then dried using infrared heat.

The interference platelets 28 and 38 can be of the type described in the earlier filed application Ser. No. 08/171,654 filed on Dec. 22, 1993, of which this is a continuation-in-part. Thus, as therein described and as herein depicted in FIG. 5 there is shown a representative embodiment of a metal-dielectric design utilizing optically variable characteristics. As described in the co-pending application the platelets can be formed by utilizing a flexible web 51 in a roll coater and having a surface 52 upon which materials are deposited to provide a multilayer thin film interference coating which is broken up to form the interference platelets 48 utilized in the high chroma durable paint 12 of the present invention.

Thus, there is provided a release coat or a layer 53 of a suitable type on the surface 52 which allows the thin film coating to be removed as thin film platelets. For example, the release coat may be an organic solvent soluble or a water soluble coating such as acrylic resins, cellulosic propionates, (polyvinyl pyrrolidine) polyvinyl alcohol or acetate. Thereafter, the first layer of the multilayer thin film interference coating can be deposited in the form of a semi-opaque layer 54 of a suitable material as for example, a metal such as chromium (Cr) to a suitable thickness ranging from 50–150 Å and preferably a thickness of approximately 70 Å. Thereafter, a dielectric layer 56 is deposited at an appropriate optical thickness, as for example two-quarter wave thickness at a design wavelength of 400 nanometers to a six-quarter wavelength thickness at a design wavelength of 700 nanometers, depending upon the color desired. One material found to be particularly satisfactory is magnesium fluoride ($MgF_2$) having an index or refraction of 1.38 which was formed to a thickness of four quarter wavelengths at a design wavelength of 550 nanometers. This is followed by an opaque reflecting metal layer 57 of a suitable material, such as aluminum. However, it should be appreciated that if desired, a semi-opaque metal layer can be provided. Typically such a metal layer becomes opaque at approximately 350–400 Å. Thus, where semi-opaqueness is desired a thickness less than 500 Å can be provided, where 100 Å can be utilized effectively. It should be appreciated that there are a number of other reflecting materials which can be utilized in the place of aluminum such as silver, copper or gold and the like depending upon the color effects desired.

After the aluminum layer 57 has been deposited, this is followed by a dielectric layer 58 which is formed of the same material and is of the same thickness as the dielectric layer 56 as hereinbefore described. For instance, it can be formed of four quarter waves of magnesium fluoride at a design wavelength of 550 nanometers. This is followed by a semi-opaque layer 59 of the same type and thickness as the semi-opaque layer 54 and as hereinbefore described can be formed of chromium having a thickness of approximately 70 Å.

In addition to pigments described above which are symmetrical, the optically variable pigment platelets could be produced where the two sides have asymmetry with respect to the dielectric layer thickness. For example, on one side there could be a four quarter wave thickness of $MgF_2$ at a design wavelength of 550 nanometers and on the other side there could be a six quarter wave of $MgF_2$ at a design wavelength of 550 nanometers. Thus, the pigment would have two different colors on both sides of the pigment and the resulting mix of platelets would show a new color which is the combination of the two colors. The resulting color would be based on additive color theory of the two colors coming from the two sides of the platelets. In a multiplicity of flakes, the resulting color would be the additive sum of the two colors resulting from the random distribution of flakes having different sides oriented toward the observer.

With the construction hereinbefore described in conjunction with FIG. 5 it can be seen that a symmetrical multilayer thin film interference structure has been provided on opposite sides of the metal reflecting layer 56 to achieve the maximum optical effects from platelets formed from such a construction. It should be appreciated that if desired, platelets can be formed which are non-symmetrical, in other words, in which the dielectric layer and the metal layer on one side of the reflector layer can be omitted, or may have different dielectric thicknesses on either side of the reflector layer.

Optically variable platelets can also be combined with non-shifting high chroma platelets to produce unique color effects. In addition, the optically variable pigment platelets can be combined with highly reflective platelets such as $MgF_2$/aluminum/$MgF_2$ platelets to produce additional color effects.

After a coating of the type shown in FIG. 5 has been formed on the web 51, a multilayer thin film interference coating can be stripped from the web 51 in a manner hereinbefore described in the application Ser. No. 08/171,654, filed Dec. 22, 1993, by use of a solvent to form flakes or platelets which are in sizes ranging from 2–200 microns also described in said application Ser. No. 08/171,654, filed Dec. 22, 1993. The platelets can be further reduced in size as desired. The flakes can be subjected to an air grind to reduce their size to a size ranging from 2–5 microns without destroying their desirable color characteristics. The flakes or platelets are produced to have an aspect ratio of at least 2:1 and preferably 5 to 10 to 1 with a narrow particle size distribution. The aspect ratio is ascertained by taking the ratio of the largest dimension of a surface of the flake parallel to the planes of the layers forming the thin film to the thickness dimension of the platelet.

In order to impart additional durability to the interference platelets 28, it has been found that it is desirable to anneal or heat treat the platelets at a temperature ranging from 200°–300° C. and preferably from 250°–275° C. for a period of time ranging from 10 minutes to 24 hours, and preferably a time of approximately 15–30 minutes.

After the platelets have been sized, they can be blended with other flakes to achieve the color required by adding flakes in different hues, chrome and brightness to achieve a desired result. The interference platelets can then be introduced into the paint vehicle being utilized in a conventional manner. At the same time, additives of the type hereinbefore described such as the carbon aluminum flake, titanium dioxide, mica and/or other conventional pigments can be mixed into the pigment vehicle to achieve the final desired effects. After this has been accomplished, the high chroma durable paint is ready for use.

By using a metal-dielectric design such as shown in FIG. 5, high chroma durable paint can be achieved in which variable color effects are noticeable to the human eye. By way of example the vehicle 11 when viewed in different angles will change color depending upon the viewing angle. The color of the automobile also varies depending on the angle of the car body relative to the viewing eye. Other color shifts can be achieved by a variation in viewing angle. By way of example, colors which can be achieved utilizing such interference platelets can have color shifts such as the gold-to-green, green-to-magenta, magenta-to-green, green-to-blue, silver-to-green, gold-to-silver, blue-to-red, etc.

Figure 6:
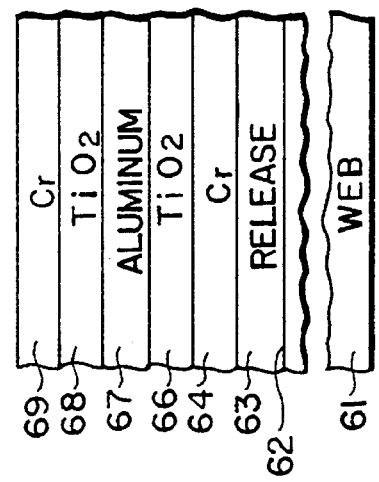
FIG. 6 is another cross-sectional view of a platelet for use in a paint incorporating the present invention of a metal-dielectric multilayer thin film interference stack providing a solid color.

When it is desired to achieve a single color, as for example a non-shifting pigment utilizing a metal-dielectric design, as shown in FIG. 6, the substrate 61 is provided with a surface 62 on which there is deposited a release coat 63. Thereafter metal and dielectric layers 64 and 66 are deposited with the metal layer being formed of chromium having a thickness of 70 Å. The dielectric layers 66 and 68 can be comprised of a high refractive index material of $\geq 2.0$ where the thickness of the layers are between two quarter waves at 400 nanometers and six quarter waves at 700 nanometers. For example, the dielectric layers may be comprised of $TiO_2$ or ZnS. This is followed by a reflecting metal layer 67 formed of aluminum to a thickness of at least 500 Å so that it is opaque followed by a dielectric layer 68 similar to the dielectric layer 66 and followed by a metal layer 69 of the same type as a metal layer 64. Highly reflective colored interference pigments can also be made wherein dielectric layers 66 and 68 are of different thicknesses.

This thin film interference coating can be separated from the web 61 in the manner hereinbefore described in FIG. 5 and can be formed in interference platelets of the desired size and can be treated at an elevated temperature for a period of time as hereinbefore described to improve durability. These interference platelets can be utilized in the pigment vehicles hereinbefore described to provide a pigment with a high chroma of a single non-shifting color which is also durable.

Figure 7:
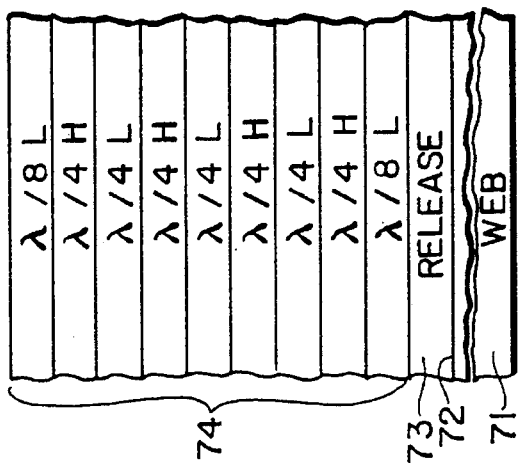
FIG. 7 is a cross-sectional view of a platelet for use in a paint incorporating the present invention of an all dielectric thin film interference stack providing optically variable characteristics.

In applications where it may be desirable to utilize an all-dielectric multilayer interference thin film, construction such as that shown in FIG. 7 can be utilized such as described in U.S. Pat. No. 4,705,256. Thus, as shown in FIG. 7, a web 71 is provided having a surface 72 with a release coat 73 thereon upon which there is deposited a symmetrical dielectric stack 74 comprised of nine layers forming, alternatively, low/high index pairs. However, such a stack can range from 5–11 layers. The stack 74 is of the form $$\left( \frac{\alpha}{2} L\beta H / \frac{\alpha}{2} L \right)^x$$

where "α" and "β" are units of quarter wave optical thicknesses of the low (L) and high (H) index materials respectively and "x" is the number of periods in the stack. Such symmetrical periods of the form previously described may involve multiple periods of that design. The low index material has an index of refraction where $n \leq 2.0$ and the high index material has an index of refraction where $n \geq 2.0$.

Such all dielectric symmetrical multilayer thin film interference films can be removed by separating the coating shown in FIG. 7 from the web in the manner hereinbefore described to form thin film interference platelets. Following the removal of the platelets from the web, the platelets can be sized and annealed in the manner described herein to provide a high durable high chroma interference platelet which can be utilized as paint 12 of the present invention to provide the desired optical characteristics very similar to the optically variable characteristics which can be achieved with the metal-dielectric construction shown in FIG. 5. By first depositing a black paint onto the surface of interest followed by the all dielectric optically variable dielectric paint, one can achieve similar high durable, high chroma color effects. The black paint layer underneath the optically variable all dielectric paint serves the function of removing transmitted light that passes through the dielectric optically variable paint.

Thus, it can be seen that the interference platelets of the present invention can be achieved utilizing either metal-dielectric designs or all-dielectric designs to achieve optically variable characteristics or non-shifting single color characteristics all of high chroma and high durability which particularly suit them for use in many applications where paints of high chroma and durability are desired. The color characteristics of the present invention are achieved by utilizing a collection of durable thin film platelets of high chroma which produce predetermined optical responses to radiation incident on the surface of the platelets.

From the foregoing it can be seen that the unique features of the optically variable pigment flakes for use in paints is that by using the same three materials, aluminum, $MgF_2$ and chromium or, alternatively, aluminum, a high index dielectric and chromium, various colors can be achieved by changing the optical design. By contrast, at the present time, different colored pigments require completely different materials. Thus, by using three materials in unique designs, thin film optical designs having various colors can be achieved, all exhibiting the same durability. In other words, if a new color is to be developed, it is not necessary for a full durability program to be carried out with the new color.

Also in connection with the present invention it can be seen that optically variable pigment platelets of different colors can be mixed with themselves. Such platelets can also be mixed with non-shifting high chroma optical pigment platelets of the type hereinbefore described as well as with other lamellar pigments, such as aluminum flakes, graphite and mica flakes, as well as with non-lamellar pigments such as aluminum powder, carbon black and other inorganic and organic pigments.

It should be appreciated that in addition to being utilized on automobiles for painting the entire body, trim and moldings can be painted. Such paints can have many other applications where the color impressions given are of importance. For example, in addition to be utilized on vehicles of various types, the paints where desired can be utilized on household appliances, architectural structures, flooring, fabrics, electronic packaging/housing, toys and the like.

What is claimed is:

1. A method for producing heat treated colored multilayer interference thin film platelets formed from a colored multilayer interference thin film construction comprising a metal reflecting layer having first and second reflective surfaces, a multilayer interference thin film structure on each of the first and second reflective surfaces, the multilayer interference thin film structure comprising a pair of layers consisting of a dielectric layer formed of a dielectric material and a semi-opaque metal layer, said pair being disposed so that the dielectric layer is directly adjacent to the metal reflecting layer and the semi-opaque metal layer faces away from the metal reflecting layer whereas the method comprises subjecting the colored multilayer interference thin film construction to a heat treatment at a temperature of 200°–300° C. for a period of 10 minutes to 24 hours to produce a heat treated colored multilayer interference thin film construction having improved durability in comparison to a colored multilayer interference thin film construction which has not been subjected to said heat treatment.

2. A method as in claim 1 wherein the colored multilayer interference thin film construction is in sheet form, the method further comprising the step of reducing said construction into platelets having a size of 2–200 microns in any dimension prior to said heat treatment.

\* \* \* \* \*

UNITED STATES PATENT AND TRADEMARK OFFICE
CERTIFICATE OF CORRECTION

PATENT NO. : 5,570,847

DATED : November 5, 1996

INVENTOR(S) : Phillips et al.

It is certified that error appears in the above-identified patent and that said Letters Patent is hereby corrected as shown below:

At Column 6, line 29, after "U.S. Pat. No.", replace "4,705,256" with -- 4,705,356 --.

Title page at [54] before "OF", replace "METHODS" with -- METHOD --.

Title page at [54] after "HEAT-TREATING", replace "MILTILAYER" with -- MULTILAYER --.

Title page at [54] before "PLATELETS", replace "INTEFERENCE" with -- INTERFERENCE --.

Signed and Sealed this

Seventeenth Day of March, 1998

Attest:

*Attesting Officer*

BRUCE LEHMAN

*Commissioner of Patents and Trademarks*